US009103264B2

(12) United States Patent
Diouf et al.

(10) Patent No.: US 9,103,264 B2
(45) Date of Patent: Aug. 11, 2015

(54) DEVICE FOR DISCHARGING UREA SOLUTION INTO AN EXHAUST GAS CONDUIT (75) Inventors: Cheikh Diouf, Silly sur Nied (FR); Frédéric Supernat, Dieuze (FR); Georges Maguin, Ars Laquenexy (FR); John Jessen Gammelgaard, Silkeborg (DK)

(73) Assignee: Grundfos Management a/s, Bjerringbro (DK)

( * ) Notice: Subject to any disclaimer, the term of this patent is extended or adjusted under 35 U.S.C. 154(b) by 1115 days.

(21) Appl. No.: 13/130,363

(22) PCT Filed: Nov. 18, 2009

(86) PCT No.: PCT/EP2009/008188
§ 371 (c)(1),
(2), (4) Date: Aug. 26, 2011

(87) PCT Pub. No.: WO2010/057617
PCT Pub. Date: May 27, 2010

(65) Prior Publication Data
US 2011/0297760 A1    Dec. 8, 2011

(30) Foreign Application Priority Data
Nov. 22, 2008   (EP) .................................... 08020355

(51) Int. Cl.
*F01N 3/00* (2006.01)
*F01N 13/18* (2010.01)
*F01N 3/20* (2006.01)

(52) U.S. Cl.
CPC .......... *F01N 13/1811* (2013.01); *F01N 3/2066* (2013.01); *F01N 2610/02* (2013.01); *F01N 2610/11* (2013.01); *F01N 2610/1453* (2013.01); *Y02T 10/24* (2013.01)

(58) Field of Classification Search
USPC .................................................... 60/272–324
See application file for complete search history.

(56) References Cited

U.S. PATENT DOCUMENTS 1,793,234 A * 2/1931 Mahler .......................... 123/468
4,928,998 A * 5/1990 Brandener ...................... 285/49

(Continued)

FOREIGN PATENT DOCUMENTS

DE    102006061733 A1    7/2008
WO      2008080687 A1    7/2008

(Continued)

OTHER PUBLICATIONS

English Translation of WO2008080695.*

(Continued)

*Primary Examiner* — Jesse Bogue
(74) *Attorney, Agent, or Firm* — Panitch Schwarze Belisario & Nadel LLP (57) ABSTRACT A device for the discharge of urea solution into an exhaust gas conduit (40) includes an injection nozzle (2) with a conduit connection (14) for the supply of urea solution, and a nozzle head which is conductively connected thereto. The urea solution may be supplied to an exhaust gas flow in a finely distributed manner by way of the nozzle head. Furthermore, the device includes a receiver (42), which surrounds an opening (46) in the exhaust gas conduit wall (44) and which is designed for the tight bearing of the nozzle head and for the releasable fastening of the injection nozzle (2). Moreover, a spring is provided for the non-positive fit bearing of the nozzle head in the receiver (42).

13 Claims, 5 Drawing Sheets (56) References Cited

U.S. PATENT DOCUMENTS

| | | | |
|---|---|---|---|
| 6,148,797 A * | 11/2000 | Gmelin | 123/456 |
| 6,263,863 B1 * | 7/2001 | Giovannini et al. | 123/470 |
| 6,481,421 B1 * | 11/2002 | Reiter | 123/470 |
| 6,805,103 B1 * | 10/2004 | Sumida et al. | 123/470 |
| 7,334,399 B2 * | 2/2008 | Carroll et al. | 60/286 |
| 7,484,499 B2 * | 2/2009 | Beardmore | 123/470 |
| 7,823,564 B2 * | 11/2010 | Edoardo et al. | 123/470 |
| 8,024,922 B2 * | 9/2011 | van Vuuren et al. | 60/286 |
| 8,327,829 B2 * | 12/2012 | Keidel et al. | 123/470 |
| 8,528,322 B2 * | 9/2013 | Van Vuuren | 60/286 |
| 2004/0118383 A1 * | 6/2004 | Gould et al. | 123/470 |
| 2005/0235632 A1 * | 10/2005 | Tarabulski et al. | 60/282 |
| 2006/0101810 A1 * | 5/2006 | Angelo et al. | 60/286 |
| 2007/0169755 A1 * | 7/2007 | Hanawa et al. | 123/470 |
| 2008/0216798 A1 * | 9/2008 | Ghelardi et al. | 123/470 |
| 2008/0302336 A1 * | 12/2008 | Fuerst et al. | 123/470 |
| 2010/0154746 A1 * | 6/2010 | Fischer et al. | 123/456 |
| 2010/0170233 A1 * | 7/2010 | Tangemann et al. | 60/299 |
| 2010/0320285 A1 | 12/2010 | Haeberer et al. | |
| 2010/0326547 A1 | 12/2010 | Haeberer et al. | |

FOREIGN PATENT DOCUMENTS

| | | |
|---|---|---|
| WO | 2008080695 A1 | 7/2008 |
| WO | 2008121319 A2 | 10/2008 |

OTHER PUBLICATIONS

Int'l Search Report Issued Jan. 19, 2010 in Int'l Application No. PCT/EP2009/008188.

* cited by examiner

Fig. 8

DEVICE FOR DISCHARGING UREA SOLUTION INTO AN EXHAUST GAS CONDUIT

CROSS-REFERENCE TO RELATED APPLICATIONS

This application is a Section 371 of International Application No. PCT/EP2009/008188, filed Nov. 18, 2009, which was published in the German language on May 27, 2010, under International Publication No. WO 2010/057617 A1 and the disclosure of which is incorporated herein by reference.

BACKGROUND OF THE INVENTION

The present invention relates generally to a device for the discharge of urea solution into an exhaust gas conduit.

Devices of this type are used, amongst other things, with motor vehicles and in particular with utility vehicles which are driven by a diesel motor, in order to reduce the emissions of nitric oxide of these motors. For this, a reduction agent is led to the exhaust gas flow coming from the motor, before entry into a catalyzer arranged in the exhaust gas conduit, for the breakdown of the nitric oxide. With regard to the reduction agent, as a rule, it is the case of an aqueous urea solution which is injected into the exhaust gas flow and there, converts the nitric oxide into nitrogen and water.

BRIEF SUMMARY OF THE INVENTION

It is an objective of a preferred embodiment of the present invention to provide a device, in which urea solution may be introduced into an exhaust gas conduit in a reliable manner, wherein the device should be simply manufacturable and able to be assembled in a motor vehicle in a simple manner. Moreover, it is a further objective of a preferred embodiment of the invention to provide a quick and simple assembly method for an injection nozzle of such a device.

The part of the above objective with regard to the device is achieved by a device with an injection nozzle, a conduit connection for the supply of urea solution, and a nozzle head, while the part with regard to the method is achieved by the method for assembly of an injection nozzle, with at least a housing stuck over a tube in a loose manner, and subsequently a component forming a nozzle head is welded to the tube. Advantageous further formations of preferred embodiments of the present invention are to be deduced from the subsequent description, as well as the drawings.

The device according to a preferred embodiment of the present invention for the discharge of urea solution into an exhaust gas conduit includes an injection nozzle on which a conduit connection for the supply of urea solution is provided. The urea solution may be supplied to the injection nozzle by way of a pump arranged on the inflow side of the injection nozzle, preferably in a manner controlled by the motor control. With regard to the pump, it may be the case of a continuously delivering pump, wherein in this case, a controllable valve is typically provided for the control of the supply of urea solution. This valve may be arranged in the entry side of the injection nozzle, or the injection nozzle itself may comprise a closure body which for example may be activated in an electromagnetic or electrical manner and which carries out a valve function. An activatable metering pump which permits a purely mechanical construction of the injection nozzle without electric components, is however preferred for conveying the urea solution.

In order to be able to lead the urea solution to an exhaust gas flow in a finely distributed manner, the injection nozzle according to a preferred embodiment of the present invention includes a nozzle head, which is conductively connected to the conduit connection for the supply of urea solution. At least one or preferably two outlet openings with crossing jet directions are arranged on this nozzle head, and are designed and arranged in a manner such that the urea solution may be introduced into the exhaust gas flow in a finely distributed manner, essentially over the whole conduit cross section of an exhaust gas conduit.

A preferred embodiment of the present invention envisages a receiver for the injection nozzle for the releasable fastening of the injection nozzle on the exhaust gas conduit. The receiver is arranged on the outer side of the exhaust gas conduit such that it partly or completely surrounds an opening in the wall of the exhaust gas conduit. The urea solution is discharged from the injection nozzle arranged in the receiver via the opening in the exhaust gas conduit wall, into the exhaust gas conduit, wherein the injection nozzle is arranged outside the exhaust gas conduit as is the case with all other constituents of the device according to the invention. Inasmuch as this is concerned, this permits a simple assembly of the device according to the invention in a motor vehicle. Moreover, the injection nozzle with this arrangement outside the exhaust gas conduit, is subjected to a considerably lower thermal load, in contrast to an injection nozzle engaging into the exhaust gas conduit, which reduces the danger of a damage to the injection nozzle due to this, and in particular the danger of out-crystallization of the urea in the injection nozzle, and a blockage of the injection nozzle which this creates.

In order to prevent a leakage of the urea solution between the injection nozzle and the exhaust gas conduit, i.e. outside the exhaust gas conduit, the receiver is designed for the sealed bearing of the nozzle head of the injection nozzle, wherein the bearing of the nozzle head in the receiver, according to a preferred embodiment of the present invention, is effected with a non-positive fit by way of spring means. Hereby, the spring means in an advantageous manner, ensure a sealed bearing of the nozzle head on the receiver, which is arranged in the exhaust gas conduit in a fixed manner, even with shakes or vibrations, which as a rule occur on operation of a motor vehicle, so that the urea solution may not flow through an unintended separation of the nozzle head from the receiver, outside the exhaust gas conduit.

The spring means used for producing non-positive fit between the nozzle head and the receiver may be separate spring elements, as well as ones fastened directly on the injection nozzle. Preferably however, loose spring means are avoided in order to simplify the assembly of the injection nozzle on the receiver. For this reason, one advantageously envisages the spring means being an integral constituent of the injection nozzle.

The type of spring element is basically infinite, wherein the spring element may be arranged on the housing in a fixed, as well as displaceable manner. With one advantageous design of the injection nozzle according to a preferred embodiment of the present invention, the spring element is supported between a bearing part displaceably arranged on the housing, and a bearing part formed on the nozzle head. Hereby, a helical spring is preferably provided, which is arranged surrounding the housing on the outside, wherein the nozzle head as well as the bearing part arranged on the housing, project radially beyond the housing section, around which the helical spring is arranged. This protruding part of the bearing part and of the nozzle head then in each case form a bearing surface for the helical spring.

Preferably, the injection nozzle includes a central tube which is movably guided in a limited manner in housing, and on whose one tube end the nozzle head is arranged. This tube serves for the supply of the urea solution to the nozzle head, thus forms a channel to the nozzle head. With this design, the bearing part displaceably arranged on the housing is fastened in or on the receiver with a positive fit, wherein a spring is supported between it and the nozzle head. Usefully hereby, the fastening of the bearing part on the receiver is effected in a manner such that the nozzle head may come to bear in the receiver amid the tension of the spring element. Moreover, the means which are required for the positive-fit fastening of the bearing part on the receiver, are preferably designed such that not only is a separation of the housing from the receiver prevented, but that also preferably a rotation of the housing and thus of the complete injection nozzle relative to the receiver is counteracted by these means. The positive-fit means preventing a rotation of the housing, moreover also permit the injection nozzle to be positioned on the exhaust gas conduit in a defined manner, and in a manner such that with it, the urea solution may be brought into the exhaust gas conduit distributed essentially over the whole inner cross section of this. The spring may advantageously be a compression spring, which presses the nozzle head in the receiver, into its bearing position in a tight manner, and retains it in the receiver position, independently of movements of the exhaust gas conduit or the receiver fastened thereto.

Preferably, the nozzle head includes a component with at least one outlet channel formed thereon, wherein this component may extend over the outer diameter of the housing and may form the bearing surface for the spring. This is advantageous inasmuch as a particularly space-saving arrangement of the spring element is possible by way of this, with which the spring element or the helical spring preferably does not extend beyond the outer periphery of the nozzle head. Further advantageously, the receiver for the injection nozzle may comprise a preferably cylindrical cavity, which forms a guide for the housing section with the helical spring arranged around it there, and for the nozzle head.

The bearing part may advantageously be formed by an essentially flat ring element, which is also provided for fastening the housing on the receiver. The ring element is usefully arranged on the housing, such that it loosely surrounds the housing and is displaceable there in this manner.

With a further advantageous design of the injection nozzle according to a preferred embodiment of the present invention, the spring may also be supported between the bearing part and a bearing surface formed in a stationary manner on the injection nozzle. In this case, the bearing surface for the spring may be designed directly on the housing of the injection nozzle, or be formed by a component fastened on the housing, preferably by a securing ring which is fastened there. This has the advantage that the nozzle head is not loaded, since it is not impinged with the force of the tensioned spring.

Although the thermal load of the injection nozzle of the device according to a preferred embodiment of the present invention is smaller compared to a nozzle engaging into the exhaust gas conduit, it is however also subjected to relatively high temperatures directly on the outer side of the exhaust gas conduit. The housing is advantageously formed as a cooling body, so that these temperatures do not lead to a crystallizing-out of the urea in the injection nozzle. Accordingly, the manner of the material and of the design of the housing is preferably such that the heat absorbed by the housing in the region of the exhaust gas conduit, may be given off rapidly and to a sufficient extent, to the air surrounding the injection nozzle. Thus, the housing may for example be an aluminum die cast part or a light-metal die cast part, on which cooling ribs are usefully formed, for increasing the surface dissipating heat. Apart from this, typically it is also possible to provide a fluid cooling in the housing, via which the heat may be led away out of the housing.

Typically, the nozzle head, which communicates directly with the exhaust gas flow, is subjected to a particularly large thermal load. In order to be able to lead the heat away out the nozzle head, one preferably envisages a design of the injection nozzle, with which an end-side of the cylindrical section of the housing of the injection nozzle bears on the nozzle head, given an arrangement of the injection nozzle in the receiver, so that the heat which is absorbed by the nozzle head, may be led away directly into the housing, and from there, preferably into the surrounding air.

In order to be able to ensure the leading-away of heat from the nozzle head to the housing designed as a cooling body, a spring for the positive fit bearing of the housing on the nozzle head is advantageously provided. This spring is preferably arranged in the housing of the injection nozzle.

Thus one further advantageous design of the injection nozzle envisages a shoulder-like widening for the arrangement of the connection receiver, being formed in the housing of the injection nozzle, wherein the spring surrounding the tube is arranged between the connection receiver and the shoulder of the widening. Arranged in such a manner, the spring presses the housing against the nozzle head, thus forms a heat bridge from the nozzle head to the housing. The spring may for example be designed as a disc spring on account of the comparatively short spring path to be realized. A design of the spring as a helical spring is however preferred.

With a further advantageous design of the injection nozzle according to a preferred embodiment of the present invention, a spring element is supported on the housing of the injection nozzle and on the receiver for the injection nozzle. Accordingly, if need be, a bearing surface for the spring element is to be provided on the injection nozzle. Particularly advantageously, one may also make do without this one bearing surface, if, as is preferably envisaged in this context, the ring element is designed in a resilient manner and is fixed on the housing of the injection nozzle. For example, the ring element with this further design is not only used for forming a positive-fit, but also for forming a non-positive fit with the receiver. For this purpose, the ring element may be designed similar to a disk spring.

Corresponding to the ring element, a type of flange may be advantageously formed on the receiver, on which flange the ring element may be brought to bear, wherein the ring element and the flange are fastened to one another preferably with a positive fit and non-positive fit, by way of a clip which engages around the ring element and the flange. Hereby, the ring element is usefully arranged on the housing, in a manner such that when the nozzle head in the receiver comes to bear on the position envisaged for this on the outer side of the opening formed on the exhaust gas conduit wall, it likewise bears on the receiver, and specifically on the flange formed on the receiver, and may be fastened on the flange.

The clip which is envisaged preferably for fastening the ring element on the flange of the receiver, in contrast to a common hose clip, is advantageously designed such that it not only engages around the ring element and the flange peripherally, but also at the flat sides distanced to one another, in an essentially play-free manner. For this, the clip usefully comprises a suitably dimensioned groove on its inner side.

The clip permits a rapid and simple fastening of the injection nozzle in the receiver, wherein the nozzle head in the receiver by way of the spring element is brought to bear tightly at the position envisaged for this, without having to specially align the injection nozzle for this.

Alternatively, as the case may be, a bayonet closure may be provided for fastening the injection nozzle on the receiver, and this bayonet closure is preferably designed in a manner such that the injection nozzle may be fastened in a two-stage manner, wherein in a first closure position, it is fixed on the receiver merely in a captive manner, and in a second closure exposition it is fastened in a spring-biased manner, as was previously the case. While the fixation procedure may be effected without a tool, as the case may be, it may be necessary to carry out the biasing procedure with the help of a tool. The two stage fastening procedure is particularly advantageous, since the injection nozzle does not need to be held when this is braced, so that both hands are available for the bracing. This is particularly advantageous with maintenance work during operation of a motor vehicle.

In order to prevent a heat transfer from the housing to the tube led therein in a central manner, the tube is preferably connected to the housing in the region of the nozzle head in a heat-conducting manner, and is distanced to the housing in the remaining region. This design permits heat to be dissipated from the tube, in the region in which it is subjected to an increased temperature, i.e., at the nozzle head, to the housing, but otherwise no heat may be transferred from the housing to the tube on account of a free space formed between the tube and the housing.

Advantageously, a connection receiver for the conduit connection to a urea solution conduit is fastened on the inflow-side end of the tube which is led in the housing. This connection receiver may for example be welded to a tube. The connection receiver is particularly advantageously designed in a sleeve-like manner and is envisaged for receiving a filter. This connection receiver may comprise a cylindrical cavity, into which the conduit connection may be screwed, wherein a cavity remains between a base of the connection receiver, on which the tube is fastened, and the conduit connection, in which cavity a filter is arranged for collecting possible contaminations of the urea solution. With this design, as the case may be, the filter may be removed and exchanged in a simple manner by way of unscrewing the conduit connection out of the connection receiver.

Particularly preferably, a region covering the opening of the exhaust gas conduit, is designed in a concavely curved manner proceeding from the exhaust gas conduit, on the receiver for the injection nozzle. This is advantageous inasmuch as with this formation and given a suitable design of the nozzle head of the injection nozzle, it permits the urea solution to be discharged in a finely distributed manner into the exhaust gas conduit, essentially over the whole cross section of the exhaust gas conduit, since the urea solution jets may already be fanned out in a suitably wide manner in the curved region of the receiver.

The nozzle head of the injection nozzle may advantageously comprise at least two exit channels which are angled to one another in a manner such that the middle axes of the exit channels cross outside the injection nozzle, in order to achieve such a fanning of the urea solution jets. This design of the nozzle head effects a collision of the urea solution jets flowing through the exit channels, which finally leads to a wide and fine distribution of the urea solution in the exhaust gas conduit. In this context, one may achieve particularly good results if, as is preferably envisaged, the distance of the crossing point of the middle axes of the exit channels, to the injection nozzle, is smaller than the diameter of an exit channel. This has the result that the urea solution jets flowing through the exit channels to some extent collide already within the nozzle head, which for this usefully comprises a trough-like recess on its outer side, in which the exit channels run out together.

A good inflow of the exit channels formed on the nozzle head may advantageously be achieved by way of forming a chamfer on the downstream end of the tube, which delimits the nozzle head, on the inner diameter, so that the inner cross section of the tube is continuously enlarged in the direction of the nozzle head.

With the method for assembly of the injection nozzle according to a preferred embodiment of the present invention, the housing is stuck loosely over the tube. A component forming the nozzle head is subsequently welded to the tube. This is advantageous inasmuch as the housing is fixed directly or indirectly between the tube and the component which forms part of the nozzle head of the injection nozzle, without having to fasten the housing on the tube or on the component. The assembly of the injection nozzle according to a preferred embodiment of the present invention is accomplished in a correspondingly rapid and simple manner. With one design of the injection nozzle, with which a helical spring is supported between the component forming the nozzle head, and a ring element arranged on the housing in a displacable manner, the ring element and the helical spring may also be stuck over the housing in a loose manner, wherein they are fixed between the housing and the component without having to fasten them individually.

BRIEF DESCRIPTION OF THE SEVERAL VIEWS OF THE DRAWINGS

The foregoing summary, as well as the following detailed description of the present invention, will be better understood when read in conjunction with the appended drawings. For the purpose of illustrating the present invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The word "lower" designates a direction in the drawings to which reference is made. The word "outwardly" refers to a direction away from a geometric center of the device in accordance with the present invention. Unless specifically set forth herein, the terms "a," "an" and "the" are not limited to one element, but instead should be read as meaning "at least one." The terminology includes the words noted above, derivatives thereof and words of similar import.

Figures 2, 3, 4:
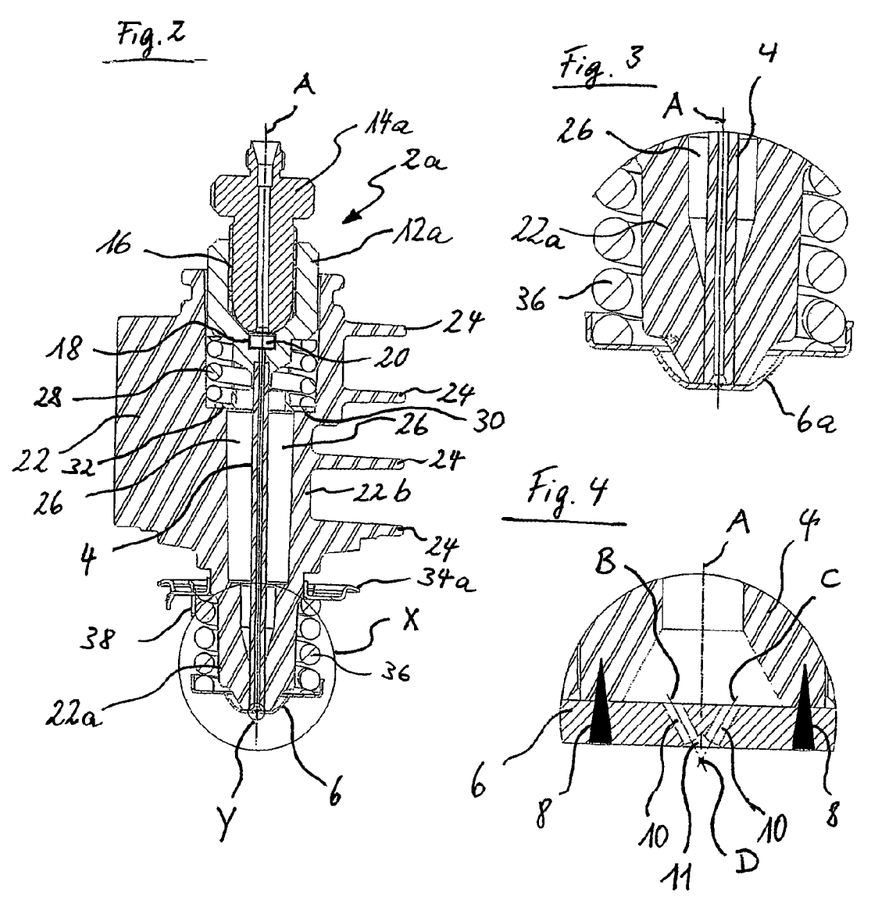
FIG. 2 is a section view of the injection nozzle of FIG. 1, along line II-II in FIG. 1.
FIG. 3 is an enlarged representation of a portion of the injection nozzle of FIG. 1, from detail X in FIG. 2.
FIG. 4 is an enlarged representation of a nozzle head of the injection nozzle according to FIG. 1, from detail Y of FIG. 2.

With all embodiment examples represented in the drawings, wherein like numerals indicate like elements throughout the several views, an injection nozzle 2a, 2b, 2c preferably includes a tube 4 which forms a flow channel to a nozzle head formed at one end of the tube 4 (FIG. 4), with which a component 6a, 6b bears at one end-side of the tube 4 and is welded there in an annular manner to the end-side of the tube 4 by way of laser welding 8 (FIG. 4). Two exit channels 10 are preferably formed on the component 6a, 6b, which are aligned obliquely to a longitudinal axis A of the tube 4, in a manner such that at a side of the component 6a, 6b which is distant to the tube 4, they run out together in a recess 11 formed there, wherein the middle axes B and C of the two exit channels 10 cross one another in a point D outside the injection nozzle 2. In order to ensure a good incoming flow of the exit channels 10 of the component 6a, 6b, the end of the tube 4, which borders the component 6a, 6b, is designed chamfered on the inside.

A connection receiver 12a with regard to the injection nozzles 2a, 2b, and a connection receiver 12b for the injection nozzle 2c, for a conduit connection 14a (injection nozzles 2a and 2b) and for a conduit connection 14b (injection nozzle 2c) respectively, are preferably fastened onto a urea solution conduit which is not shown, at the end of the tube 4 which is distant to the nozzle head. With regard to the injection nozzles 2a, 2b represented in FIGS. 2 and 6, the connection receivers 12a preferably have a significantly greater diameter than the tube 4, and are formed hollow in a sleeve-like manner, wherein the cavity thus formed in the connection receiver 12a, proceeding from an opening to the receiver of the conduit connection 14a in the direction of the nozzle head, firstly forms a cylindrical section 16, and subsequently tapers into a likewise cylindrical section 18. The conduit connection 14 is preferably screwed to the connection receiver 12a, in the section 16, while a filter 20 for keeping back contamination in the urea solution is arranged in the section 18. With regard to the injection nozzle 2c represented in FIG. 7, the connection receiver 12b is designed in an essentially cylindrical manner. A cavity is preferably formed on the conduit connection 14b at the end which faces the nozzle head in the installation position. This cavity preferably includes a first cylindrical section, into which the connection receiver 12b engages. A second cylindrical section with a smaller inner diameter, in which a filter 20 is arranged, connects to the first cylindrical section of the cavity of the conduit connection 14b.

The tube 4 with all injection nozzles 2a, 2b, 2c is preferably arranged centrally in a housing 22. Since the injection nozzles 2a, 2b, 2c are arranged in the direct vicinity of an exhaust gas conduit 40, which will be dealt with in more detail later, they are subjected to comparatively high temperatures. The housing 22 for this reason is designed especially for the dissipation of the heat introduced into the injection nozzles 2a, 2b, 2c, and forms a cooler, which dissipates its heat to the surrounding air of the injection nozzles 2a, 2b, 2c. The housing 22, connecting directly to the nozzle head, comprises a first section 22a formed in a conical manner, on whose end facing the base part 6a, a truncated-cone-shaped tapering is formed. The section 22a of the housing 22, merges into a section 22b, on which four radial outwardly projecting cooling ribs 24 are formed.

With all injection nozzles 2a, 2b, 2c, the tube 4 is preferably movably guided in the housing 22 in a guide channel 26 formed therein. The guide channel 26, where the nozzle head is formed, firstly has an inner diameter corresponding to the outer diameter of the tube 4, which, with the injection nozzles 2, 2b, then increases in several steps, in a manner such that in the region of the section 22b of the housing 22, it corresponds roughly to the outer diameter of the connection receiver 12. In this region, the connection receiver 12a and the tube 4 fastened thereon, with regard to the injection nozzles 2a, 2b, are resiliently mounted on a helical compression spring 28 which is supported on an underlay disc 32 lying on a shoulder 30 of the guide channel 26, whilst the connection receiver 12b, with regard to the injecting nozzle 2c, engages into the guide channel 26 without lying on a shoulder, wherein it is sealed with respect to the wall of the guide channel 26 by way of a sealing ring 64.

Figure 1:
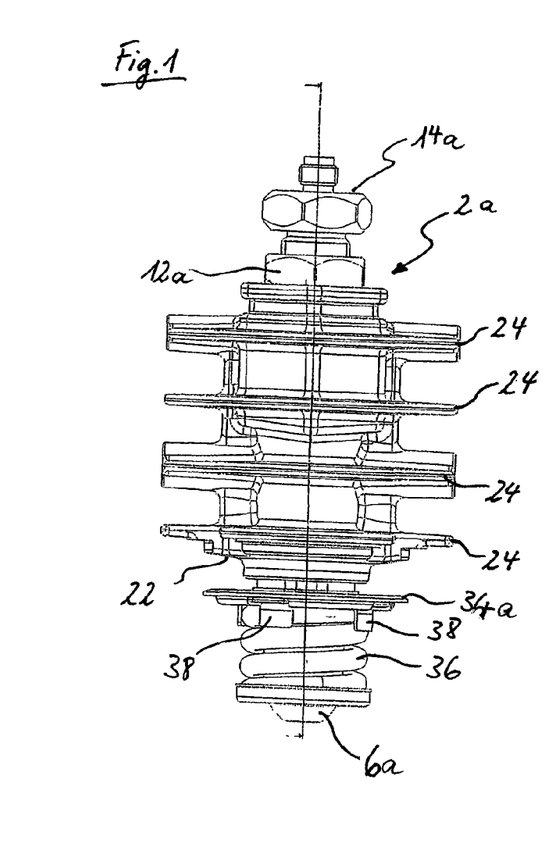
FIG. 1 is a lateral view of an injection nozzle in accordance with a first preferred design of the present invention.

With the injection nozzles 2a, 2b, a ring element 34a is preferably displaceably arranged in the region of the section 22a and distanced to the nozzle head, on the outer side of the housing 22. This ring element 34a is designed as a punched part and, proceeding from the outer side of the housing 22, extends radially outwards. Since a steel spring in the form of the helical spring 36 is supported on the ring element 34a, the ring element 34a is formed of an at least equally hard material as the helical spring 36, preferably of steel, in order, on operation of the device according to the invention, to prevent the helical spring 36 working its way into the ring element 34a. The component 6a has a section which is truncated in a calotte-like manner, which is arranged on the outer side of the truncated cone shaped tapering of the section 22a of the housing 22. Proceeding from the section truncated in a calotte-like manner, at which the component 6a is welded to the tube 4, the component 6a extends radially outwards beyond the outer diameter of the section 22a of the housing 22. This section of the component 6a, which extends radially over the outer periphery of the section 22a, with regard to the injection nozzle 2a represented in FIGS. 1 and 3, just as with the flat side of the ring element 34a, which faces the component 6a, in each case forms a bearing surface for a helical spring 36, which is arranged surrounding the section 22a of the housing 22. The helical spring 36 is preferably centered relative to the longitudinal axis A of the tube 4 by way of sections 38 of the component 6a, which are angled in the direction of the component 6a.

Figure 6:
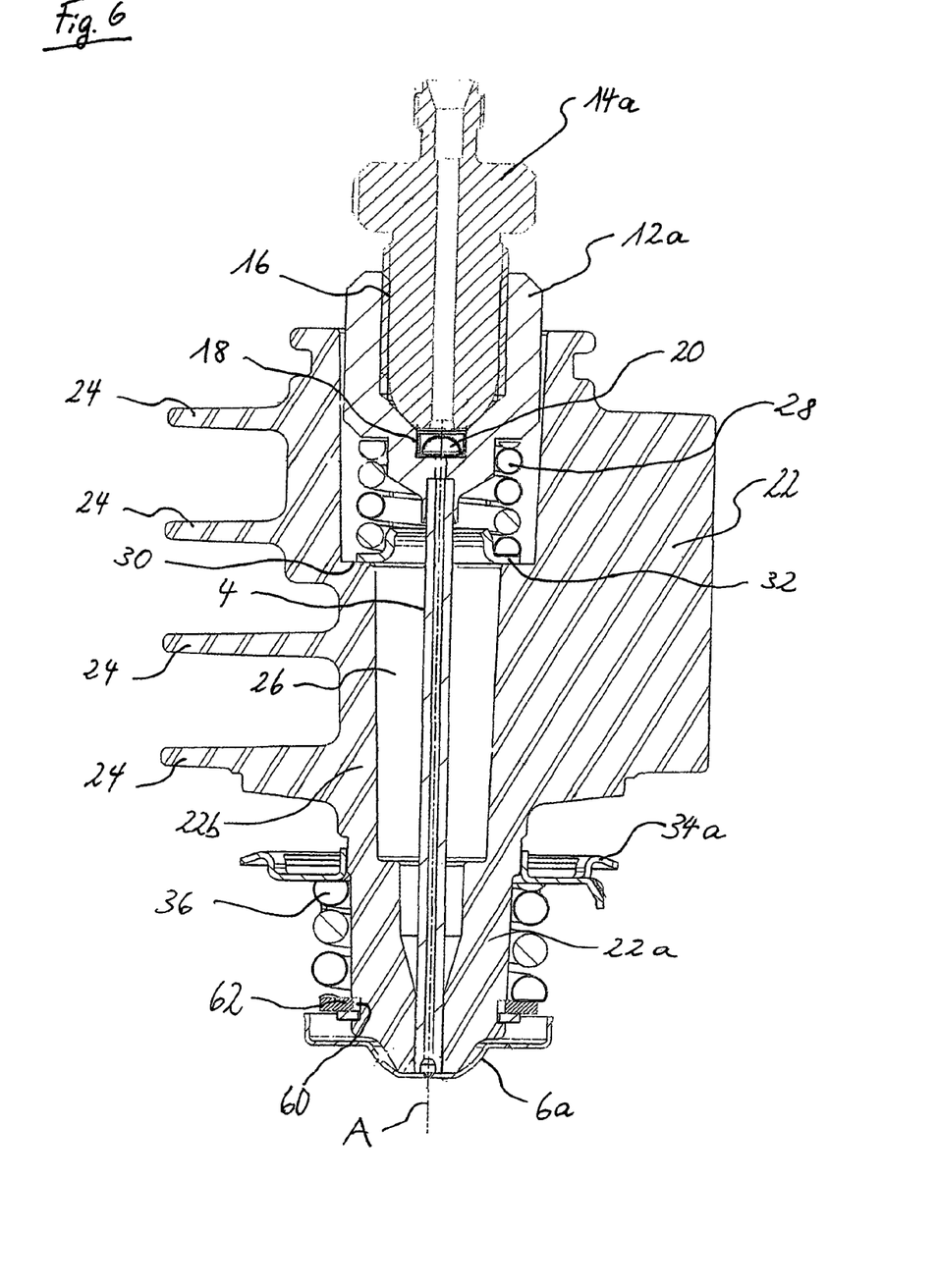
FIG. 6 is a lateral view of an injection nozzle in accordance with a second preferred design of the present invention.

In contrast to the injection nozzle 2a, the helical spring 36 with regard to the injection nozzle 2b represented in FIG. 6, is preferably not supported between the ring element 34a and the component 6a. Instead, a groove 60, in which a securing ring 62 is clamped, is formed on the end of the section 22a of the housing 22, said end facing the component 6a. The helical spring 36 is preferably arranged between this securing ring 60 and the ring element 34a.

Figure 7:
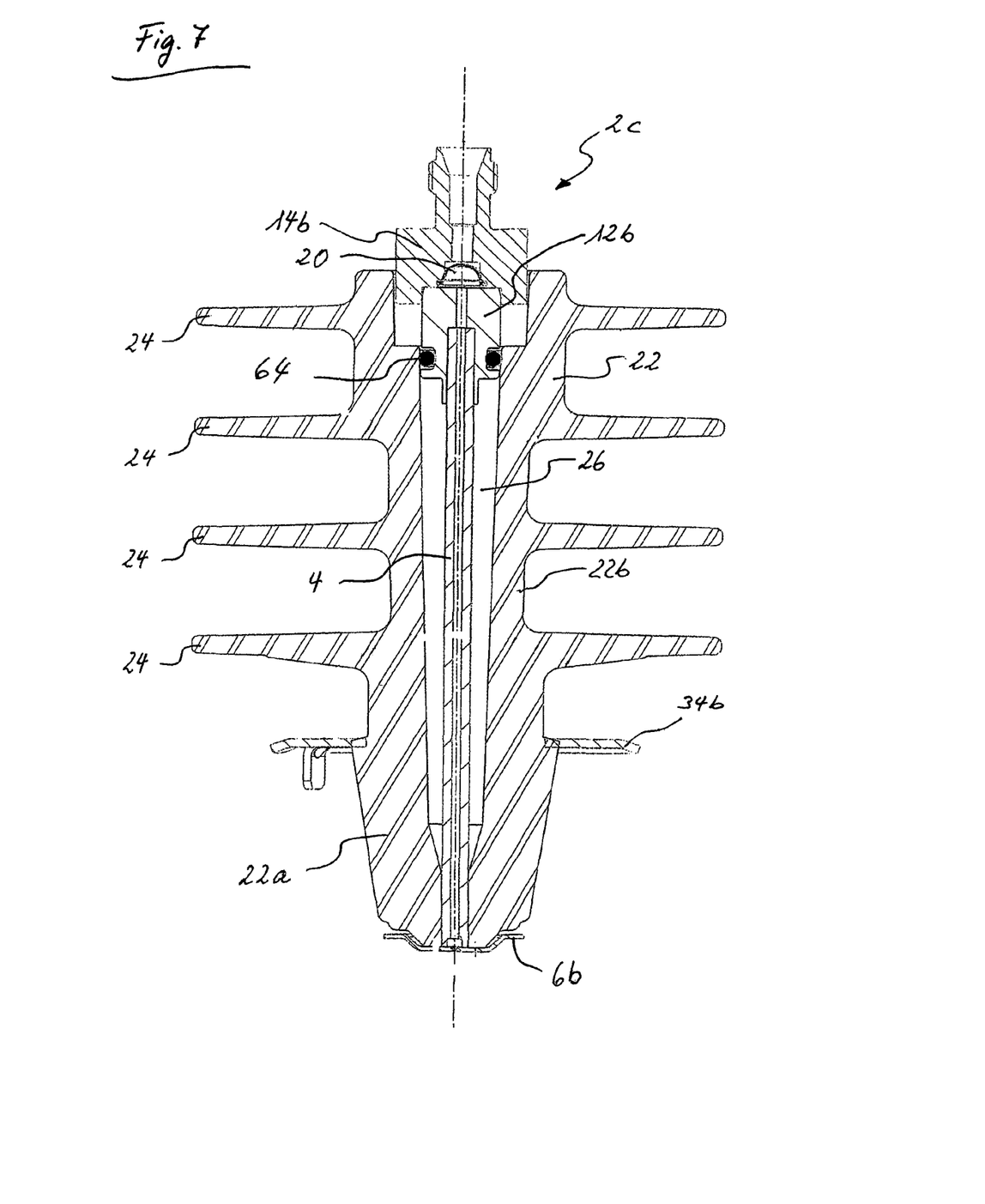
FIG. 7 is a lateral view of an injection nozzle in accordance with a third preferred design of the present invention.

In contrast to the injection nozzles 2a, 2b, with the injection nozzle 2c, no helical spring which is supported between the ring element 34b and the component 6b, is provided. Instead of this, the ring element 34b itself preferably forms a spring element, and for this purpose is designed in the manner of a disc spring as a slightly conical ring shell, which is elastically deformable in a certain region and which is fastened on the housing 22 at the transition from the section 22a into the section 22b.

Figure 5:
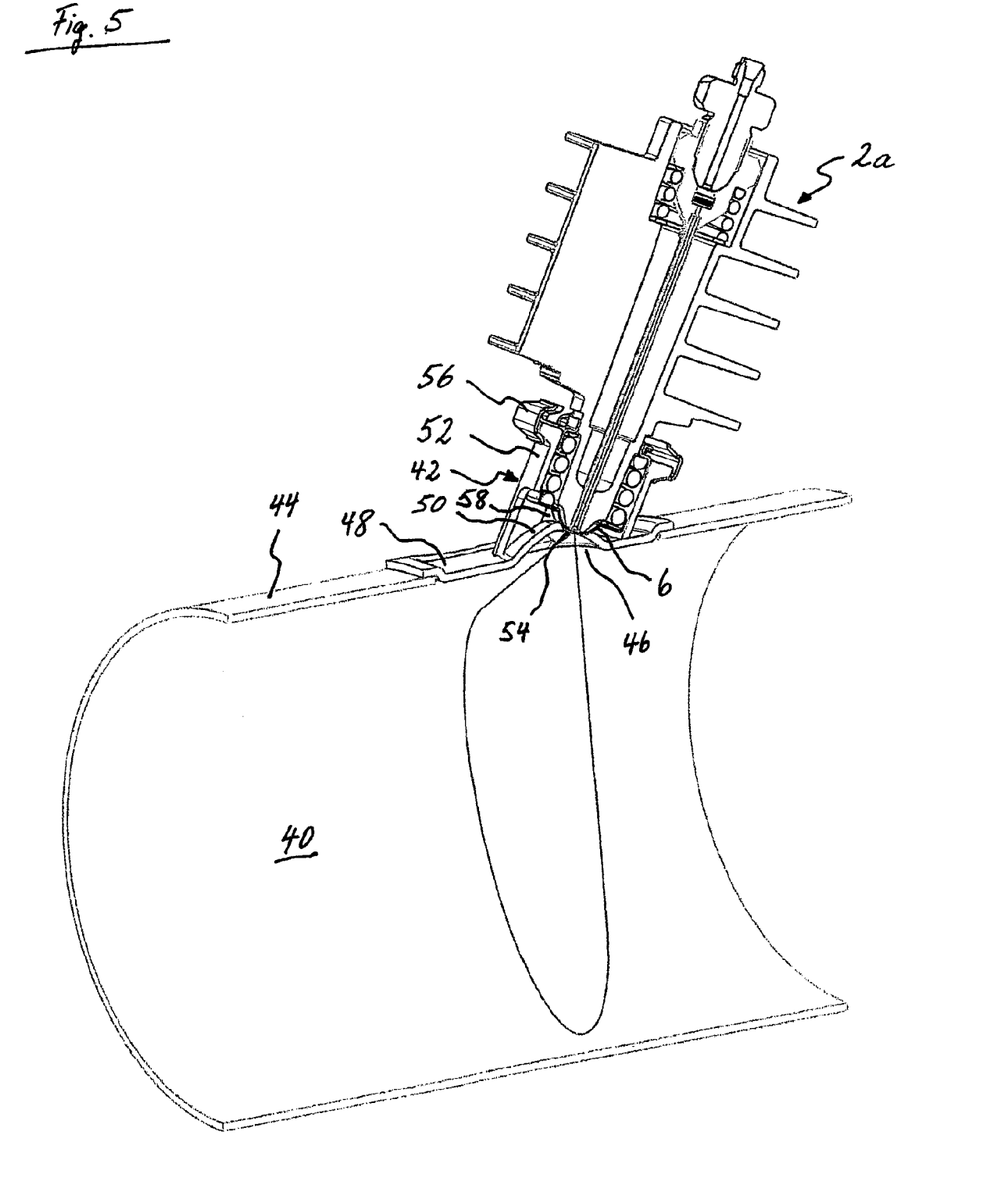
FIG. 5 is a partly sectioned view of the injection nozzle according to FIG. 1, arranged in a receiver arranged in an exhaust gas conduit.
Figure 8:
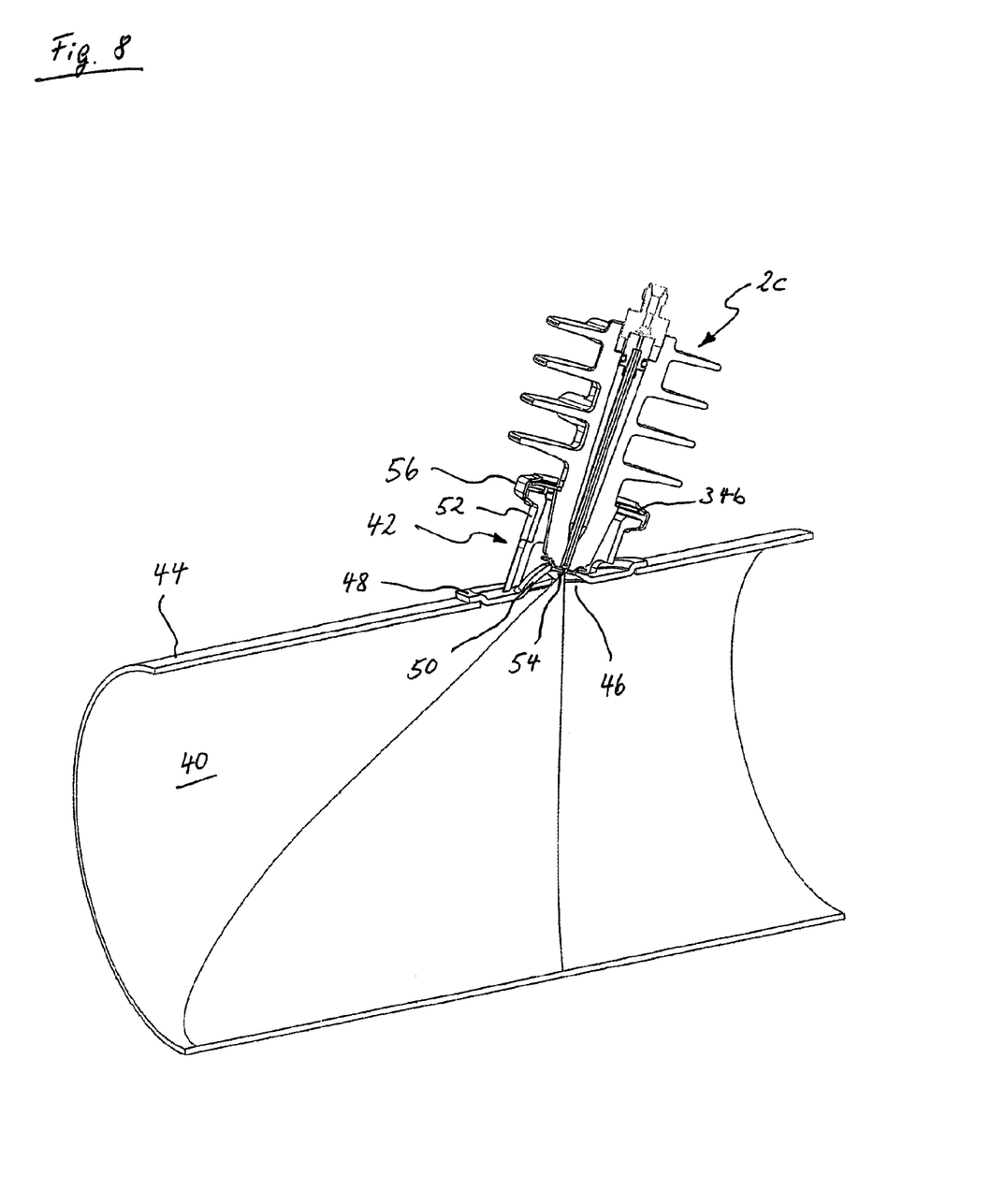
FIG. 8 is a partly sectioned view of the injection nozzle according to FIG. 7, arranged in a receiver arranged in an exhaust gas conduit.

FIGS. 5 and 8 show the injection nozzle 2a, 2c, respectively, in a receiver 42 arranged on an exhaust gas conduit 40. An opening 46 is formed on the wall 44 of the exhaust gas conduit 40. An essentially saddle-like basis component 48 of the receiver 42, which corresponds to the peripheral contour of the exhaust gas conduit 40, is arranged on the outer side of the wall 44 of the exhaust gas conduit, in a manner such that it overlaps the edge of the opening 46. The basis component 48 is welded to the exhaust gas conduit 40 in a gas-tight manner.

The basis component 48, directly on the outer side of the opening 46, has a concave curvature 50 which proceeds from the inside of the exhaust gas conduit 40. The curvature 50 is surrounded by a tube piece 52. A flange is formed at the free end of the tube piece 52. The tube piece 52 serves for receiving the nozzle head of the injection nozzle 2, and is aligned obliquely to the longitudinal extension of the exhaust gas conduit 40, in a manner such that urea brought out of the injection nozzles 2a, 2b, 2c, flows into the exhaust conduit 40 in the flow direction of the exhaust flow, by which means the urea in the exhaust gas conduit 40 may be entrained by the exhaust gas flow in a suitable manner.

On positioning the injection nozzle 2a, 2b, 2c, in each case the section of the components 6a, 6b, on which the exit channels 10 are formed, said section formed flattened in a calotte-like manner, is brought to bear tightly on the edge of an opening 54 provided on the curvature 50, said edge being designed in a chamfered manner. With regard to the injection nozzles 2a and 2b, this is effected by way of the ring element 34a fastened on the housing 22 of the injection nozzle 2 being applied onto the end-side of the flange of the tube piece 52 and being fixed on the flange with a positive fit, with a clip 56 which not only engages around the flange and the ring element 34a peripherally, but also on their flat-sides which are distant to one another. The helical spring 36 of the injection nozzle 2 is tensioned by way of this, and presses the component 6a against the edge of the opening 54. The non-positive fit bearing of the component 6b on the opening 54 is effected with the positioning of the injection nozzle 2c, by way of the ring element 34b being elastically deformed due to the application and fastening of the clip 56, in a manner such that the injection nozzle is pressed onto the edge of the opening 56 amid tension of the ring element 34b. The tube piece 52 comprises four openings 58 distributed over its periphery, in order to be able to lead away the heat in the region of the nozzle head.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device for discharging urea solution into an exhaust gas conduit, the device comprising an injection nozzle (2) having a conduit connection (14) for supply of urea solution and a nozzle head conductively connected thereto and with which urea solution may be supplied to an exhaust gas flow in a finely distributed manner, a receiver (42) surrounding an opening (46) in an exhaust gas conduit wall (44) and designed for sealed bearing of the nozzle head and for releasable fastening of the injection nozzle (2), and a helical spring (36) for a non-positive fit bearing of the nozzle head in the receiver (42);

wherein the helical spring (36) is supported between a bearing part arranged on a housing (22) in a displaceable manner, and a bearing surface is formed on the nozzle head;

wherein the injection nozzle (2) includes a central tube (4) movably guided in the housing (22), and on whose one end the nozzle head is arranged, wherein the helical spring (36) is supported between the nozzle head and the bearing part, and wherein the bearing part is fastened in or on the receiver (42) with a positive fit; and wherein the nozzle head includes a component (6a) with at least one outlet channel (10) which is formed thereon and which extends over an outer diameter of the housing (22) and forms the bearing surface for the helical spring (36).

2. The device according to claim 1, wherein the helical spring forms a part of the injection nozzle (2).

3. The device according to claim 1, wherein the bearing part is formed by a flat ring element (34a).

4. The device according to claim 1, wherein the helical spring (36) is supported between a bearing part and a bearing surface which is formed on the injection nozzle in a stationary manner.

5. The device according to claim 3, wherein a flange is formed on the receiver (42), on which flange the ring element (34a) may be brought to bear, wherein the ring element (34a) and the flange are fastened to one another by way of a clip (56) engaging around the ring element (34a) and the flange.

6. The device according to claim 1, wherein the tube (4) is connected to the housing (22) in a heat-conducting manner in a region of the nozzle head, and is otherwise distanced to the housing (22).

7. The device according to claim 1, wherein a connection receiver (12) for the conduit connection (14) is fastened to a urea solution conduit at an inflow-side end of the tube (4) led in the housing (22).

8. The device according to claim 7, wherein the connection receiver (12) is a sleeve and receives a filter (20).

9. The device according to claim 1, wherein a region of the receiver (42) which covers the opening (46) of the exhaust gas conduit (40) proceeding from the exhaust gas conduit (40) is concavely curved.

10. A method for assembly of an injection nozzle (2) with the features specified in the claim 1, wherein at least the housing (22) is stuck over the tube (4) in a loose manner, and subsequently the component (6a) forming the nozzle head is welded to the tube (4).

11. A device for discharging urea solution into an exhaust gas conduit, the device comprising an injection nozzle (2) having a conduit connection (14) for supply of urea solution and a nozzle head conductively connected thereto and with which urea solution may be supplied to an exhaust gas flow in a finely distributed manner, a receiver (42) surrounding an opening (46) in an exhaust gas conduit wall (44) and designed for sealed bearing of the nozzle head and for releasable fastening of the injection nozzle (2), and a helical spring (36) for a non-positive fit bearing of the nozzle head in the receiver (42);

wherein a housing (22) of the injection nozzle (2) bears on the nozzle head; and wherein a further spring (28) is provided for non-positive-fit bearing of the housing (22) on the nozzle head.

12. The device according to claim 11, wherein the further spring (28) is arranged in the housing (22).

13. A device for discharging urea solution into an exhaust gas conduit, the device comprising an injection nozzle (2) having a conduit connection (14) for supply of urea solution and a nozzle head conductively connected thereto and with which urea solution may be supplied to an exhaust gas flow in a finely distributed manner, a receiver (42) surrounding an opening (46) in an exhaust gas conduit wall (44) and designed for sealed bearing of the nozzle head and for releasable fastening of the injection nozzle (2), and a helical spring (36) for a non-positive fit bearing of the nozzle head in the receiver (42);

wherein the helical spring (36) is supported between a bearing part arranged on a housing (22) in a displaceable manner, and a bearing surface is formed on the nozzle head;

wherein the injection nozzle (2) includes a central tube (4) movably guided in the housing (22), and on whose one end the nozzle head is arranged, wherein the helical spring (36) is supported between the nozzle head and the bearing part, and wherein the bearing part is fastened in or on the receiver (42) with a positive fit;

wherein a connection receiver (12) for the conduit connection (14) is fastened to a urea solution conduit at an inflow-side end of the tube (4) led in the housing (22); and     wherein a shoulder widening for arranging the connection receiver (12) is formed in the housing (22) of the injection nozzle (2), wherein a further spring (28) surrounding the tube (4) is arranged between the connection receiver (12) and a shoulder (30) of the widening.

\* \* \* \* \*